United States Patent [19]

Gottesman

[11] Patent Number: 4,544,567

[45] Date of Patent: Oct. 1, 1985

[54] SIMULTANEOUS COFFEE HYDROLYSIS AND OIL EXTRACTION

[75] Inventor: Martin Gottesman, Paramus, N.J.

[73] Assignee: General Foods Corporation, White Plains, N.Y.

[21] Appl. No.: 571,896

[22] Filed: Jan. 18, 1984

[51] Int. Cl.$^4$ .............................................. A23F 5/24
[52] U.S. Cl. ..................................... 426/594; 426/417
[58] Field of Search ................................ 426/594, 417

[56] References Cited

U.S. PATENT DOCUMENTS 4,508,745  4/1985  Fulger et al. ........................ 426/594

OTHER PUBLICATIONS

Sivetz et al., Coffee Technology, 1979, Avi:Westport, Connecticut, pp. 568–574.

*Primary Examiner*—Joseph Golian

*Attorney, Agent, or Firm*—Basam E. Nabulsi; Thomas R. Savoie; Daniel J. Donovan

[57] ABSTRACT

A method of simultaneously hydrolyzing spent coffee grounds and extracting the coffee oil therefrom is disclosed. Spent coffee grounds are slurried in water and the pH is adjusted by the addition of an acid to the slurry. A water-immiscible oil solvent is combined with and dispersed as fine droplets in the slurry. The dispersion is then passed through a reactor, preferably a plug flow reactor, so as to hydrolyze the spent coffee grounds and extract the coffee oil into the oil solvent droplets. The then coffee oil-containing oil solvent is separated from the aqueous hydrolysate and the spent grounds are also separated from the hydrolysate. The coffee oil is optionally recovered from the oil solvent and the aqueous hydrolysate is optionally neutralized and combined with a soluble coffee extract.

9 Claims, No Drawings

SIMULTANEOUS COFFEE HYDROLYSIS AND OIL EXTRACTION

TECHNICAL FIELD

The present invention relates to a method of simultaneously hydrolyzing spent coffee grounds and extracting the oil therefrom. More particularly, the invention involves relatively high-temperature, short-time, acid-catalyzed hydrolysis of spent coffee grounds, with the simultaneous extraction of the coffee oil from the grounds.

BACKGROUND ART

It has long been recognized that spent coffee grounds, such as those from a countercurrent multistage extraction system, can be hydrolyzed, particularly at elevated temperatures in the presence of an acid catalyst, to provide additional useful coffee solids. For instance, U.S. Pat. No. 2,573,406 to Clough et al. discloses a process for producing a soluble coffee which involves hydrolyzing atmospherically extracted coffee grounds in 1% sulphuric acid at 100° C. for about one hour, neutralizing and filtering the hydrolysate, combining the hydrolysate with atmospheric extract and subsequently drying the combined extract to provide the soluble coffee. Benner et al. disclose a similar process in U.S. Pat. No. 2,687,335, only phosphoric acid is used in place of the sulphuric acid. Both prior art methods are relatively slow and inefficient, requiring upwards of one hour to produce the hydrolysate. Moreover, neither the Clough et al. nor Benner et al. methods provide for the simultaneous recovery of the coffee oil known to be present in spent coffee grounds.

A more efficient hydrolysis method is disclosed in by Fulger et al. in U.S. Pat. No. 4,508,745, issued on Apr. 2, 1985. The commonly assigned patent application discloses relatively high-temperature, short-time, acid-catalyzed hydrolysis of coffee material in a reactor, typically a plug flow reactor. The coffee material is slurred in water, resulting in a relatively dilute hydrolysate, at times less than about 5% by weight coffee solids. Such a dilute hydrolysate can require extensive concentration, representing an additional cost. Moreover, Fulger et al. do not provide for the concurrent extraction of the coffee oil from the coffee material.

It is an object of the present invention to provide a method of simultaneously hydrolyzing spent coffee grounds and extracting the coffee oil therefrom.

Another object of the invention is to provide a method of hydrolyzing spent coffee grounds which produces a more concentrated hydrolysate.

DISCLOSURE OF THE INVENTION

It has now been found that the objects of the invention are met by a method of hydrolyzing spent coffee grounds which involves first slurrying the spent grounds in water, acidifying the slurry and then dispersing an oil solvent in the slurry. The dispersion is subsequently passed through a reactor, typically a plug flow reactor, at an elevated temperature so as to hydrolyze the coffee grounds and extract the oil into the oil solvent. The solvent, then containing coffee oil, is separated from the aqueous hydrolysate slurry and the hydrolysate is separated from spent coffee grounds.

Although any coffee material still containing hydrolyzable material and coffee oil may be used in the method of the present invention, partially extracted spent grounds from a commercial coffee percolation system are particularly useful. Such a percolation system is typically a countercurrent multi-stage extraction battery in which water at a temperature in excess of about 175° C. is fed to the most spent section. Coffee extract is withdrawn from the column containing the freshest, least extracted coffee. After a previously determined cycle time has elapsed, flow to the most spent section is halted, a column containing unextracted coffee is brought on stream and the flow is adjusted throughout the extraction battery. The coffee discharged from the spent section is termed spent coffee grounds. As can be seen in Table 1 below, the spent coffee grounds contain approximately 45% by weight polymeric carbohydrates and about 10% by weight non-alkaloid nitrogenous material which are potentially hydrolyzable by the method of the present invention. In addition, the spent grounds contain about 25% by weight coffee oil (lipids) and it is desirable to recover this valuable coffee oil.

TABLE 1

| Approximate Composition of Spent Coffee Grounds | |
|---|---|
| Component | % by weight (dry basis) |
| Polymeric carbohydrates | 45 |
| lipids (coffee oil) | 25 |
| inert material | 20 |
| "protein" (non-alkaloid nitrogenous material) | 10 |

A dispersion of the water-immisible oil solvent in an acidified aqueous spent grounds slurry is ultimately prepared for passage through the reactor. The first step is to prepare the aqueous spent grounds slurry. The proper slurry solids content is selected based on the desire to maintain a flowable slurry as well as the need to have sufficient solvent for efficient extraction. For a plug flow reactor, it is typically preferable to use a reactant containing between about 5% and 25% by weight total solids (dry basis). However, the slurry of the present invention is diluted by the oil solvent dispersed therein and so, the slurry is typically prepared with a higher solids content than would otherwise be the case. The object is a dispersion containing 5% to 25% by weight solids. Thus, for example, if the water-immiscible oil solvent is dispersed in the slurry at a volume ratio of 1:1 solvent to slurry, the initial slurry can be prepared with 10% to 40% by weight spent grounds (dry basis) so that the dispersion only has 5% to 20% by weight solids. The corresponding slurry solids content for other volume ratios should be apparent to a worker skilled in the art. If the liquid densities differ significantly, the density difference must be taken into account in determining the proper slurry solids content.

One advantage of the present invention is apparent when it is realized that the soluble coffee solids obtained by the hydrolysis are soluble in water but are not typically soluble in the water-immiscible oil solvent. As described above, the use of the oil solvent permits the use of a slurry with a higher solids content or in other words, permits the use of less water in the slurry. However, if less water is used, the resulting hydrolysate will contain a higher concentration of the soluble coffee solids because the coffee solids are not typically dissolved in the oil solvent. The advantage, of course, lies in the lower concentration load because of the higher starting concentration of the hydrolysate.

After the slurry has been prepared at the proper spent grounds solids content, the slurry is acidified by the addition of an acid to adjust the pH to between 0.7 and 3.0. The acid catalyzes the hydrolysis reaction. Specific acid catalysts intended for use in the method of the present invention include the inorganic mineral acids as well as organic acids. Sulphuric acid, a strong mineral acid, is especially useful in the present method because of the relatively small amount of the acid needed to reach the desired pH as well as the ease with which sulphuric acid is separated from the finished hydrolysate by precipitation. Moreover, sulphuric acid enjoys wide use in the food processing industry. Additional inorganic acids include phosphoric acid, nitric acid, hydrochloric acid and combinations thereof. Suitable organic acids, used either alone or in combination, include acetic acid, citric acid, tartaric acid, malic acid, adipic acid and fumaric acid. Carbon dioxide gas can be injected into the dispersion to form carbonic acid, another suitable acid catalyst. The organic acids, being generally weaker than the mineral acids, are ued in relatively greater amounts to achieve the proper pH adjustment.

Once the slurry of the spent coffee grounds has been prepared and adjusted to the proper pH, a water-immiscible oil solvent is dispersed in the slurry at a volume ratio between 3:1 and 1:1 oil solvent to slurry. Suitable oil solvents include those which are in fact water-immiscible, which dissolve the coffee oil contained in the spent coffee grounds and which preferably do not dissolve the soluble coffee solids produced from the hydrolysis of the coffee solids. The oil solvent selected is most preferably approved for use in food processing. Hexane is a particularly convenient oil solvent, being readily available, relatively inexpensive and approved for use in food processing. Other convenient oil solvents include dichlorodifluoromethane compounds, as for example Freon ®, light mineral oils, higher molecular weight alcohols, toluene and combinations thereof. The choice of a suitable solvent from those meeting the above criteria is directed by safety, cost, availability and like considerations.

The water-immiscible oil solvent is most preferably dispersed in the aqueous, pH-adjusted slurry as fine droplets of the solvent in aqueous phase. The dispersion is produced by any of the techniques known in the art. Placing the oil solvent and pH-adjusted slurry together in a tank and moderately agitating the contents is one suitable method. The agitation should not be so violent as to lead to the formation of an emulsion but vigorous enough to form the dispersion. Another method of dispersing the oil solvent is to circulate the two liquids through an in-line mixer or the like. The specific method of dispersion used is not critical provided the method is not so violent as to form unwanted emulsion and provided that the oil solvent is dispersed as fine droplets.

Having thus prepared the dispersion, it is then passed through a reactor so as to provide for the simultaneous hydrolysis of the coffee grounds and the extraction of the oil therefrom. Suitable reactors are those which are capable of promoting the short time, high temperature hydrolysis reaction as well as keeping the mixture sufficiently dispersed so that the spent coffee grounds continually contact the dispersed oil solvent droplets. Plug flow reactors have been found to be especially convenient. A plug flow reactor is basically a length of cylindrical pipe through which the reactant is passed so that the reaction can take place. The term "plug flow" refers to the relatively flat velocity profile of the reactant flowing through the pipe in contrast to the normally parabolic profile wherein the fluid in the center of the conduit has a higher velocity than the fluid flowing close to the wall. Reactor geometry must be such that a sufficient velocity is maintained to prevent settling of the solids as well as breaking the water/solvent dispersion. The discharge end of the plug flow reactor is capped by an orifice or other flow restrictor to control the pressure in the reactor and also to control the rate of discharge. The contents of the reactor may be heated by submerging the reactor in a heat bath or by direct injection of steam into the reactor. Alternatively, the reactant can be heated prior to being fed to the reactor which may then be insulated to maintain the desired temperature.

The hydrolysis reaction intended herein is a so-called short time, high temperature hydrolysis. The residence time of the dispersion in the reactor is preferably from 5 seconds to 60 seconds, most preferably about 10 to 15 seconds. If the reaction is carried out for a much shorter period, there will be insufficient hydrolysis. A much longer reaction time might lead to the degradation of the hydrolyzed coffee solids. The temperature of the reaction is preferably carried out between about 180° C. and 240° C. The reaction time and temperature as well as the pH of the slurry are all interrelated. There is an inverse relationship between the reaction time and the temperature. Thus, if a temperature towards the higher end of the above range is selected, a shorter residence time is required to obtain the same amount of hydrolysis. There is a direct relationship between the reaction time and pH, with a lower slurry pH requiring a shorter residence time and/or lower temperature again, to attain the same amount of hydrolysis.

Simultaneous extraction of the coffee oil from the spent coffee grounds arises from the spent coffee grounds continually contacting the dispersed droplets of the water-immiscible oil solvent as the dispersion passes through the reactor, particularly a plug flow reactor. Although the spent coffee grounds are hydrophilic and so will not actually penetrate the dispersed water-immiscible solvent droplets, it has been found that it is sufficient for the spent grounds to merely randomly contact the dispersed droplets in order to extract the coffee oil. Such random contact comes about in the reactor, particularly the plug flow reactor, in which there is constant mixing within the fluid reactant.

The dispersion exiting the reactor contains coffee oil-containing oil solvent, hydrolyzed spent grounds and an aqueous hydrolysate. The dispersion is at an elevated temperature and it may be preferable to cool the dispersion before further processing but it is by no means necessary to do so. The coffee oil-containing oil solvent may be separated from the hydrolyzed spent grounds and hydrolysate by any of the methods known in the art for separating two immiscible liquids. Centrifugation and passage through an oil separator are just two examples. The valuable coffee oil may then be recovered from the oil solvent such as by evaporation and stripping of the more volatile solvent. The recovered oil solvent may be recycled to the method of the present invention.

It is then necessary to separate the hydrolyzed spent grounds from the aqueous hydrolysate. It may be desirable to neutralize the slurry prior to separation so that the hydrolyzed spent grounds are not at a low pH when disposed of. Alterntively, the hydrolyzed grounds may be separated from the hydrolysate prior to neutralization. Separation is again by known methods such as filtration, centrifugation, pressing etc. Neutralization may be by addition of a base to precipitate out the acid as a salt, by ion exchange resin and like methods. Acid removal in the case of volatile organic acids may simply be by steam stripping of the hydrolysate. The hydrolyzed spent grounds may simply be disposed of as waste or burned for their fuel value.

The neutralized hydrolysate may be combined with another coffee extract, such as a conventional coffee extract used in soluble coffee processing. Inasmuch as the hydrolysate tends to be more dilute than conventional extract, it may be desirable to concentrate the hydrolysate prior to the combination with the coffee extract. The hydrolysate provides for the addition of economically valuable soluble coffee solids but does not adversely affect the flavor of the resulting coffee extract. The combined coffee extract may be dried by conventional techniques to provide a soluble coffee. It may also be desirable to apply the known aroma enriching techniques to the combined coffee extract to diminish the flavor-diluting effect of the relatively bland hydrolysate.

The following example is intended to illustrate certain embodiments of the present invention. The example is not meant to limit the invention beyond what is claimed below.

EXAMPLE

Spent coffee grounds from a commercial percolation system were used for the example. The grounds had had about 50% of the starting roasted and ground coffee weight extracted in the percolation system. The grounds were slurried in water so that the slurry had about 10% by weight dry basis coffee grounds. The slurry was divided into two experimental samples and a control. The control sample and two experimental samples were then passed through a plug flow reactor. The reactor consisted of coiled stainless steel tubing of about 2.1 mm. I.D. immersed in a fluidized sand bath so as to regulate temperature. There was an orifice of between 0.75 mm and 1.0 mm on the discharge end of the reactor. The reactor was connected by a valve to an agitated autoclave capable of withstanding elevated pressure. The experimental samples were combined with hexane at a 1:1 volume ratio of hexane to slurry and the hexane was dispersed in the slurry by the agitation in the autoclave. The control sample was diluted with an equal volume of water. Sulphuric acid was added to each of the three samples at a level of about 1% by weight. The reactant was placed in the autoclave which was sealed and pressurized to a pressure of about 32 atm with nitrogen. The valve connecting the autoclave and reactor was opened at the appropriate time and the pressure forced the slurry or dispersion through the reactor. The material exiting the reactor was collected, cooled and separated on standing into the coffee oil-containing hexane, hydrolyzed spent grounds and the hydrolysate. The reaction conditions and results are shown in Table 2 below. All percentages are by weight unless indicated.

TABLE 2

| REACTION CONDITIONS AND RESULTS | | | |
|---|---|---|---|
| | CONTROL | SAMPLE 1 | SAMPLE 2 |
| % solids in Dispersion (dry basis) | 4.34 | 8.68 | 8.68 |
| % Sulphuric Acid in Aqueous Phase | 1.0 | 1.0 | 1.0 |
| Reaction Time (seconds) | 25 | 23 | 60 |
| Reaction Temperature (°C.) | 200 | 200 | 200 |
| % Hydrolyzed Coffee Solids Yield | 39 | 31 | 44 |
| % Available oil extracted into the Hexene | — | 52 | 53 |

As is apparent, the yield of hydrolyzed coffee solids was comparable in all these cases but the two experimental samples, using the hexane oil solvent, provided for the simultaneous extraction of about 50% of the coffee oil from the coffee grounds.

What is claimed is:

1. A method of simultaneously hydrolyzing coffee grounds and extracting the coffee oil therefrom which comprises:
    (a) slurrying the spent coffee grounds in water so that the grounds are from 10% to 40% by weight of the slurry;
    (b) adding an acid to the slurry to adjust the pH to between 0.7 and 3.0 ;
    (c) combining the pH-adjusted slurry with a water-immiscible, oil solvent at a volume ratio of from 1:1 to 3:1 oil solvent to slurry;
    (d) dispersing the oil solvent in the pH-adjusted slurry as finely divided droplets;
    (e) heating the dispersion of (d) in a reactor to a temperature between 180° C. and 240° C. in from 5 seconds to 60 seconds so as to hydrolyze the coffee grounds and extract the oil therefrom; and
    (f) separating the then coffee oil-containing oil solvent from the aqueous hydrolysate and separating the grounds from the hydrolysate.

2. A method as in claim 1 wherein the reactor of (e) is a plug flow reactor.

3. A method as in claim 1 wherein the acid of (b) is selected from the group consisting of sulphuric acid, phosphoric acid, nitric acid, hydrochloric acid, acetic acid, citric acid, tartaric acid, malic acid, adipic acid, fumaric acid and combinations thereof.

4. A method as in claim 1 wherein the water-immiscible oil solvent is selected from the group consisting of hexane, toluene, dichlorodifluoromethane compounds, light mineral oils, higher molecular weight alcohols, and combinations thereof.

5. A method as in claim 1 wherein the coffee grounds are the spent grounds from a countercurrent multi-stage coffee percolation system.

6. A method as in claim 1 which further comprises recovering the coffee oil from the coffee oil-containing oil solvent of (f).

7. A method as in claim 6 wherein the coffee oil is recovered by evaporating the oil solvent.

8. A method as in claim 1 which further comprises neutralizing the aqueous hydrolysate of (f) after separation from the coffee oil-containing oil solvent and before or after separation from the hydrolyzed spent grounds.

9. A method as is claim 8 which further comprises combining the neutralized aqueous hydrolysate with an aqueous soluble coffee extract and drying the combination to produce a dried soluble coffee.

* * * * *